US010259286B2

(12) United States Patent
Janier et al.

(10) Patent No.: US 10,259,286 B2
(45) Date of Patent: Apr. 16, 2019

(54) DEVICE FOR CONTROLLING THE TEMPERATURE OF A BATTERY, COMPRISING AN EVAPORATOR FOR COOLING THE BATTERY AND A RADIATOR FOR HEATING THE BATTERY

(71) Applicant: RENAULT s.a.s., Boulogne-Billancourt (FR)

(72) Inventors: Benoit Janier, Chaville (FR); Pascal David, Voisins-le-Bretonneux (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 79 days.

(21) Appl. No.: 15/504,132

(22) PCT Filed: Jul. 16, 2015

(86) PCT No.: PCT/EP2015/066241
§ 371 (c)(1),
(2) Date: Apr. 3, 2017

(87) PCT Pub. No.: WO2016/026619
PCT Pub. Date: Feb. 25, 2016

(65) Prior Publication Data
US 2017/0282676 A1    Oct. 5, 2017

(30) Foreign Application Priority Data

Aug. 19, 2014 (FR) ...................... 14 57869

(51) Int. Cl.
*B60H 1/32* (2006.01)
*F25D 23/12* (2006.01)
(Continued)

(52) U.S. Cl.
CPC ..... *B60H 1/00278* (2013.01); *B60H 1/00921* (2013.01); *B60K 11/02* (2013.01);
(Continued)

(58) Field of Classification Search
CPC ............ B60H 1/00278; B60H 1/00921; B60H 1/323; B60H 1/143; B60H 2001/00307;
(Continued)

(56) References Cited

U.S. PATENT DOCUMENTS

2002/0184908 A1   12/2002  Brotz et al.
2007/0157647 A1   7/2007   Duhme et al.
(Continued)

FOREIGN PATENT DOCUMENTS

DE    10 2007 004 979 A1    8/2008

OTHER PUBLICATIONS

International Search Report dated Oct. 9, 2015 in PCT/EP2015/066241 filed Jul. 16, 2015.
(Continued)

Primary Examiner — Joseph Trpisovsky
(74) Attorney, Agent, or Firm — Oblon, McClelland, Maier & Neustadt, L.L.P.

(57) ABSTRACT

A device that controls a temperature of a battery onboard a motor vehicle includes an air-conditioning circuit of the motor vehicle in which circulates, as a first heat-transfer fluid, an air-conditioning fluid. The air-conditioning circuit includes at least one evaporator for direct transfer of heat emitted by the battery to the air-conditioning fluid and a compressor to increase a pressure and a temperature of the air-conditioning fluid. The device also includes a cooling circuit in which circulates, as a second heat-transfer fluid, a cooling fluid. The cooling circuit includes at least one first heat source to heat the cooling fluid and at least one main radiator to cool the cooling fluid that can be short-circuited. The cooling circuit also includes a battery radiator to directly transfer heat conveyed by the hot cooling fluid to the battery when the main radiator of the cooling circuit is short-circuited.

9 Claims, 3 Drawing Sheets

(51) Int. Cl.
   *B60H 1/00*    (2006.01)
   *B60K 11/02*   (2006.01)
   *B60K 1/00*    (2006.01)

(52) U.S. Cl.
   CPC .............. *B60H 2001/00307* (2013.01); *B60H 2001/00928* (2013.01); *B60K 2001/003* (2013.01); *B60K 2001/005* (2013.01)

(58) Field of Classification Search
   CPC ........... B60H 2001/00928; B60H 2001/00949; B60K 11/02; B60K 2001/003; B60K 2001/005; H01M 10/60; H01M 10/625; H01M 10/6569; H01M 10/6568; H01M 10/6567; H01M 10/663; B60L 11/1874; B60L 11/1875; F25B 5/02
   USPC ................................................ 62/259.2, 239
   See application file for complete search history.

(56) References Cited

U.S. PATENT DOCUMENTS

| | | | |
|---|---|---|---|
| 2011/0139397 A1* | 6/2011 | Haussmann | B60H 1/00278 165/43 |
| 2012/0301755 A1* | 11/2012 | Axelsson | B60K 6/48 429/62 |
| 2013/0140001 A1* | 6/2013 | Mandl | F28F 27/02 165/96 |
| 2014/0041826 A1* | 2/2014 | Takeuchi | B60L 1/02 165/10 |
| 2014/0202178 A1* | 7/2014 | Trumbower | B60L 11/1874 62/62 |

OTHER PUBLICATIONS

French Search Report dated May 7, 2015 in FR1457869 filed Aug. 19, 2014.

* cited by examiner

DEVICE FOR CONTROLLING THE TEMPERATURE OF A BATTERY, COMPRISING AN EVAPORATOR FOR COOLING THE BATTERY AND A RADIATOR FOR HEATING THE BATTERY

TECHNICAL FIELD OF THE INVENTION

The invention concerns a device for controlling the temperature of a battery onboard a motor vehicle.

TECHNICAL BACKGROUND OF THE INVENTION

The invention more particularly concerns a device for controlling the temperature of a battery onboard a motor vehicle, the temperature control device including:

an air-conditioning circuit of the motor vehicle in which circulates a first heat-transfer fluid termed the "air-conditioning fluid", the air-conditioning circuit including at least one evaporator for direct transfer of heat emitted by the battery to the air-conditioning fluid, a compressor making it possible to increase the pressure and the temperature of the air-conditioning fluid;

a cooling circuit in which circulates a second heat-transfer fluid termed the "cooling fluid", the cooling circuit including at least one first heat source adapted to heat the cooling fluid and at least one main radiator for cooling the cooling fluid that can be short-circuited.

An electric or hybrid motor vehicle is driven at least in part by a traction electric motor that is supplied with electricity by a traction battery. The performance of the traction battery can vary greatly as a function of its temperature.

If the battery is subjected to very low temperatures, for example temperatures below zero, it loses its energy capacity. Fast charging of the battery may then be prohibited. It is therefore necessary to heat the battery before charging it.

Similarly, using the battery produces heat. If the battery is already overheated, either because of a high ambient temperature or because of too rapid alternation of discharging and charging, it can be necessary to prohibit the use of the battery to protect the cells. This generally involves immobilizing the vehicle for the time taken for the battery to cool to an acceptable operating temperature.

To solve these problems, it is known to equip the vehicle with a device for controlling the temperature of the battery in order to maintain the cells of the battery within a range of optimum operating temperatures.

Thus it has been proposed to equip the battery with a heat-transfer fluid circuit that makes it possible to cool it or to heat it, as required.

Thus, in the application DE-A1-10 2007 004 979, the heat-transfer fluid circulates in an air-conditioning circuit of the vehicle. In this way, the battery is cooled in parallel with the passenger compartment of the vehicle.

Moreover, the electrical control of the battery is handled by an electronic control unit that gives off a great deal of heat when operating. To prevent damage to the electronic components of this unit, it is cooled by a cooling circuit separate from the air-conditioning circuit. A main radiator makes it possible to dissipate the heat emitted by the electronic control unit.

To make it possible to heat the battery, it is known to use the heat given off by the electronic control unit. To this end, a heat exchanger makes it possible to transfer heat conveyed by the cooling fluid to the air-conditioning fluid circulating in the air-conditioning circuit.

To improve the capacity for heating the battery, the cooling circuit is equipped with a pipe that is able to short-circuit the main radiator when the battery needs to be heated.

A device of the above kind as described in DE-A1-10 2007 004 979 nevertheless has numerous disadvantages. Thus the adaptation of the heat exchanger to make it possible to heat the air-conditioning fluid before being able to heat the battery leads to an additional cost in the manufacture of the temperature control device.

Moreover, the heat given off by the electronic control unit is not entirely transmitted to the battery because some heat is lost in the heat exchanger. This device is therefore not totally effective.

Moreover, the prior art device does not make it possible to heat the battery rapidly when starting the vehicle from cold. In fact, the electronic control unit begins to heat up only after a certain time of use. During this time lapse, no source of heat is available for heating the battery. It is therefore necessary to use thermo plungers, which consume a very large amount of energy.

SUMMARY OF THE INVENTION

The invention proposes a temperature control device of the type described above characterized in that the cooling circuit includes a second, secondary radiator termed the "battery radiator" for direct transfer of heat conveyed by the hot cooling fluid to the battery when the main radiator of the cooling circuit is short-circuited.

According to other features of the invention:

the cooling circuit includes a second heat source that is formed by a heat exchanger that is arranged directly upstream of the battery radiator and makes it possible to transfer heat from the air-conditioning fluid directly to the cooling fluid, the heat exchanger being arranged directly downstream of the compressor in the air-conditioning circuit;

the air-conditioning circuit includes:
  a modulation pipe that is adapted to short-circuit the evaporators downstream of the condenser and upstream of the compressor by controlling a modulation valve when the air-conditioning circuit is operating in a mode termed the "heat pump" mode; and
  an expansion valve that is arranged in a bypass between the heat exchanger and a condenser, a bypass valve enabling control of the passage of the air-conditioning fluid in the expansion valve in the "heat pump" mode of the air-conditioning circuit;

the cooling circuit includes a cold start pipe a first end of which is connected as a bypass between the battery radiator and the first heat source and a second end of which is arranged upstream of the heat exchanger, a pump being arranged in the branch including the battery radiator, and a cold start valve enabling, in a cold start first position, the cooling fluid to flow in a loop by short-circuiting simultaneously the first heat source and the main radiator;

when the first heat source is sufficiently hot the cold start valve can be set to a second heating position in which the cooling fluid flows in a loop through the first heat source and then the second heat source before reaching the battery, the cold start pipe 60 being blocked;

the cold start valve can be set to a third position in which the radiator of the battery is short-circuited, the cooling circuit including a second pump to enable circulation of the cooling fluid between the first heat source and the main radiator;

the cooling circuit includes thereto plungers that heat the cooling fluid if the two heat sources are not hot enough;

the part of the heat exchanger through which the air-conditioning fluid flows forms a condenser;

the first heat source is formed by an electronic control unit that controls the electrical charging of the battery.

BRIEF DESCRIPTION OF THE FIGURES

Other features and advantages of the invention will become apparent on reading the following detailed description, for an understanding of which reference should be made to the appended drawings, in which.

DETAILED DESCRIPTION OF THE FIGURES

In the remainder of the description elements having identical structures or similar functions are designated by the same reference.

In the remainder of the description the terms "upstream" and "downstream" are used as a function of the direction of flow of the heat-transfer fluids in their respective circuits.

Figure 1:
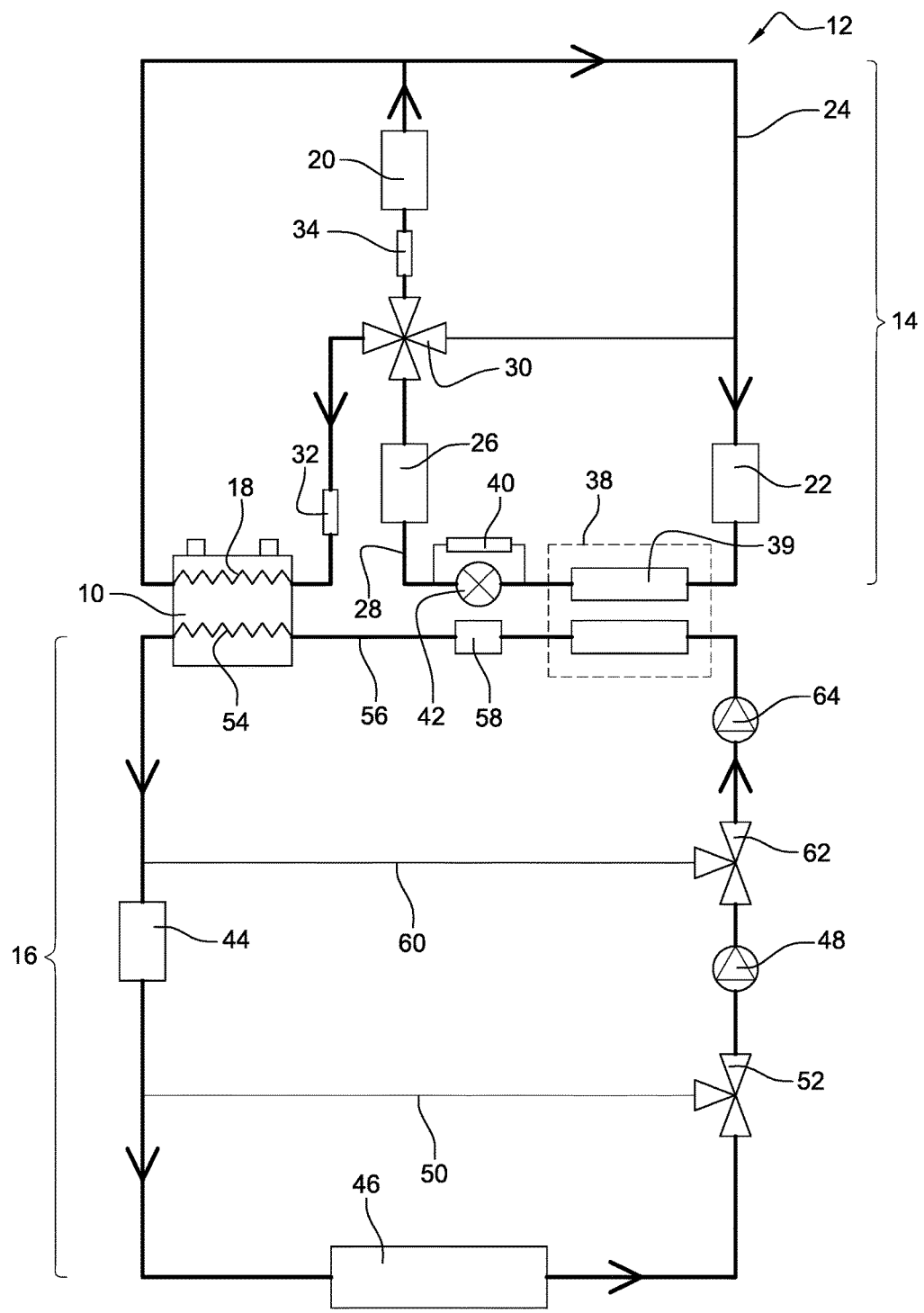
FIG. 1 is a diagram showing a device for controlling the temperature of a battery produced in accordance with the teachings of the invention, the device operating in accordance with a battery cooling state.

FIG. 1 shows a battery 10 onboard a motor vehicle. It is for example a traction battery 10 that supplies power to a traction electric motor of the vehicle.

When the vehicle is operating, the temperature of the battery 10 is controlled by a temperature control device 12 onboard the vehicle. The temperature of the battery 10 is controlled to maintain it within a range of optimum operating temperatures.

The temperature control device 12 primarily includes:

an air-conditioning circuit 14 of the vehicle in which circulates a first heat-transfer fluid termed the "air-conditioning fluid"; and a cooling circuit 16 in which circulates a second heat-transfer fluid termed the "cooling fluid".

These two circuits 14 and 16 are fluid-tight with respect to each other, i.e. the air-conditioning fluid and the cooling fluid do not mix.

The air-conditioning fluid is intended to change phase as it circulates in the air-conditioning circuit 14, as explained in more detail hereinafter. It is freon, for example.

The air-conditioning circuit 14, shown at the top in the figures, includes a first evaporator 18 that passes through the battery 10. The first evaporator 18 makes it possible to transfer heat emitted by the battery 10 directly to the cold air-conditioning fluid. For this reason, this first evaporator 18 is hereinafter designated the "battery evaporator 18". This battery evaporator 18 is intended to cool the battery 10 if its temperature exceeds a particular upper threshold.

The air-conditioning circuit 14 is also intended to cool a passenger compartment of the vehicle. To this end, the air-conditioning circuit 14 also includes a second evaporator 20 in parallel with the battery evaporator 18. The second evaporator 20, termed the "passenger compartment evaporator 20", is disposed in a ventilation duct (not shown) of the passenger compartment to cool the air therein.

In each of the evaporators 18, 20 the air-conditioning fluid goes from the liquid phase to the gas phase by evaporation. This causes the air-conditioning fluid to absorb heat.

The two evaporators 18, 20 are connected in parallel to a common compressor 22 on their downstream side by a common pipe 24. The compressor 22 is intended to compress the air-conditioning fluid when in the gas phase. This increases the temperature and the pressure of the air-conditioning fluid.

The compressor 22 feeds a downstream condenser 26 via a pipe 28. In the condenser 26 the air-conditioning fluid goes from the gas phase to the liquid phase by condensation. This causes a loss of heat from the air-conditioning fluid.

The condenser 26 then feeds each of the evaporators 18, with air-conditioning fluid via a controlled modulation valve 30.

Upstream of each evaporator 18, 20 and downstream of the modulation valve 30 an associated expansion valve 32, 34 makes it possible to reduce the pressure and therefore the temperature of the air-conditioning fluid when in the liquid phase before reaching the associated evaporator 18, 20.

The air-conditioning circuit 14 is also able to operate in a "heat pump" mode.

To this end, the air-conditioning circuit 14 includes a modulation pipe 36 that is adapted to short-circuit the evaporators 18, 20 directly downstream of the condenser 26. The modulation pipe 36 therefore conveys the air-conditioning fluid from the condenser 26 directly to the compressor 22.

The flow of the air-conditioning fluid in the modulation pipe 36 is controlled by a valve. Here this is the modulation valve 30. The modulation valve 30 can therefore be set to at least two positions:

a first position termed the "air-conditioning" position in which the air-conditioning fluid flows toward the evaporators 18, 20 and the modulation pipe 36 is blocked; and a second position termed the "heat pump" position in which the air-conditioning fluid flows directly to the compressor 22 via the modulation pipe 36, the evaporators 18, 20 no longer being supplied with air-conditioning fluid.

Moreover, a heat exchanger 38 is disposed in the pipe 28 that leads from the compressor 22 to the condenser 26. The heat exchanger 38 is therefore directly downstream of the compressor 22 so that the hot air-conditioning fluid in the gas phase passes through it.

As explained hereinafter, the heat exchanger 38 makes it possible to transfer heat conveyed by the air-conditioning fluid to the cooling fluid. The structure and the operation of this heat exchanger 38 are described in detail hereinafter.

In the embodiment shown in the figures, the part of the heat exchanger 38 through which the air-conditioning fluid passes forms a condenser 39.

An expansion valve 40 bypasses the section of the pipe 28 between the heat exchanger 38 and the condenser 26.

A bypass valve 42 has:

a first position termed the "direct" position in which the air-conditioning fluid flows directly in the pipe 28 without forced passage through the expansion valve 40 in a normal operating mode of the air-conditioning circuit 14 termed the "air-conditioning mode"; and a second position termed the "expansion" position in which the flow of the air-conditioning fluid is diverted to the expansion valve 40 in the "heat pump" mode of the air-conditioning circuit 14.

The cooling circuit 16, which is shown at the bottom in the figures, is described in detail next.

In this cooling circuit 16 the cooling fluid is intended to remain in the liquid phase. It is a mixture of water and antifreeze, for example.

The cooling circuit 16 includes a first heat source 44 that is able to heat the cooling fluid. Here the first heat source 44 is formed by an electronic control unit 44 the function of which is to control the electrical charging of the battery 10. An electronic control unit 44 of this kind is known to generate a great deal of heat when operating. Now, its electronic components can be damaged by too high a temperature. The cooling circuit 16 therefore makes it possible to reduce the temperature of the electronic control unit 44 by allowing the cold cooling fluid to absorb the heat emitted via a heat exchange surface (not shown).

The cooling fluid heated in this way by the electronic control unit 44 is routed to a main radiator 46 for cooling the cooling fluid. The cooling fluid is circulated by means of a first pump 48 which here is downstream of the main radiator 46 and upstream of the electronic control unit 44.

The cooling circuit 16 also includes a heating pipe 50 that makes it possible to short-circuit the main radiator 46. This heating pipe 50 is connected downstream of the electronic control unit 44 and upstream of the first pump 48. A heating valve 52 has:

a first, cooling position in which the cooling fluid is caused to pass through the main radiator 46 by blocking the flow in the heating pipe 50; and a second, heating position in which the main radiator 46 is short-circuited.

The cooling circuit 16 includes a second, secondary radiator 54 termed the "battery radiator 54" that makes it possible to transfer heat conveyed by the hot second cooling fluid directly by conduction to the battery 10 when the main radiator 46 of the cooling circuit 16 is short-circuited.

The battery radiator 54 is in a pipe section 56 downstream of the first pump 48 and upstream of the electronic control unit 44. This section 56 is hereinafter designated the "heating section 56".

The cooling circuit 16 includes a second heat source that is formed by the heat exchanger 38 in the heating section 56 directly upstream of the battery radiator 54 and downstream of the first pump 48. The heat exchanger 38 makes it possible to transfer heat directly from the air-conditioning fluid to the cooling fluid when the air-conditioning circuit 14 operates in "heat pump" mode.

The cooling circuit 16 also includes thermo plungers 58 in the heating section 56 between the heat exchanger 38 and the battery radiator 54. The thermo plungers 58 heat the cooling fluid if the temperature of the battery 10 is below a particular lower threshold and if the quantity of heat supplied by the heat exchanger 38 and/or the electronic control unit 44 is insufficient.

The cooling circuit 16 also includes a pipe 60 termed the "cold start pipe 60" a first end of which is connected as a bypass between the battery radiator 54 and the electronic control unit 44 and a second end of which is upstream of the heat exchanger 38 and downstream of the first pump 48.

A cold start valve 62 has at least two positions:

a first, cold start position in which the cooling fluid is caused to circulate in a loop in the cold start pipe 60 and in the heating section 56 including the battery radiator 54 by short-circuiting simultaneously the electronic control unit 44 and the main radiator 46;

a second, heating position in which the cold start pipe 60 is blocked if the temperature of the electronic control unit 44 exceeds a particular temperature.

To make it possible for the cooling fluid to flow in a loop when the cold start valve 62 is in the cold start position there is a second pump 64 in the heating section 56 downstream of the cold start valve 62 and upstream of the heat exchanger 38.

In a variant of the invention that is not shown, the cold start valve can be set to a third position in which the pipe section including the battery radiator is short-circuited. The flow of the cooling fluid between the main radiator and the electronic control unit then passes through the first pump.

All the valves are for example automatic solenoid valves that operate as a function of various parameters including the temperature of the battery 10.

The operation of the temperature control device 12 as a function of various parameters including the temperature of the battery 10 and the temperature of the electronic control unit 44 is described next with reference to FIG. 1. The temperature control device 12 has three operating states.

As shown in FIG. 1, if the temperature of the battery 10 exceeds a particular upper threshold the temperature control device 12 is set to a state for cooling the battery 10.

The air-conditioning circuit 14 then operates in "air-conditioning" mode in which the modulation valve 30 occupies its first, air-conditioning position and the bypass valve 42 occupies its first, "direct" position.

The flow of the air-conditioning fluid is represented in bold in FIG. 1. In this cooling state the temperature of the air-conditioning fluid passing through the heat exchanger 38 is insufficient to modify significantly the temperature of the cooling fluid.

For its part the cooling circuit 16 operates to cool the electronic control unit 44. To this end, the heating valve 52 is set to its cooling position and the second, cold start valve 62 is set to its heating position.

When the temperature control device 12 is set to its cooling state, the battery 10 is cooled normally by the air-conditioning circuit 14 and the electronic control unit 44 is cooled by the cooling circuit 16. The battery 10 is also partly cooled by the cooling circuit 16, the cooling fluid flowing through the battery radiator 54 having been cooled beforehand by the main radiator 46.

Figure 2:
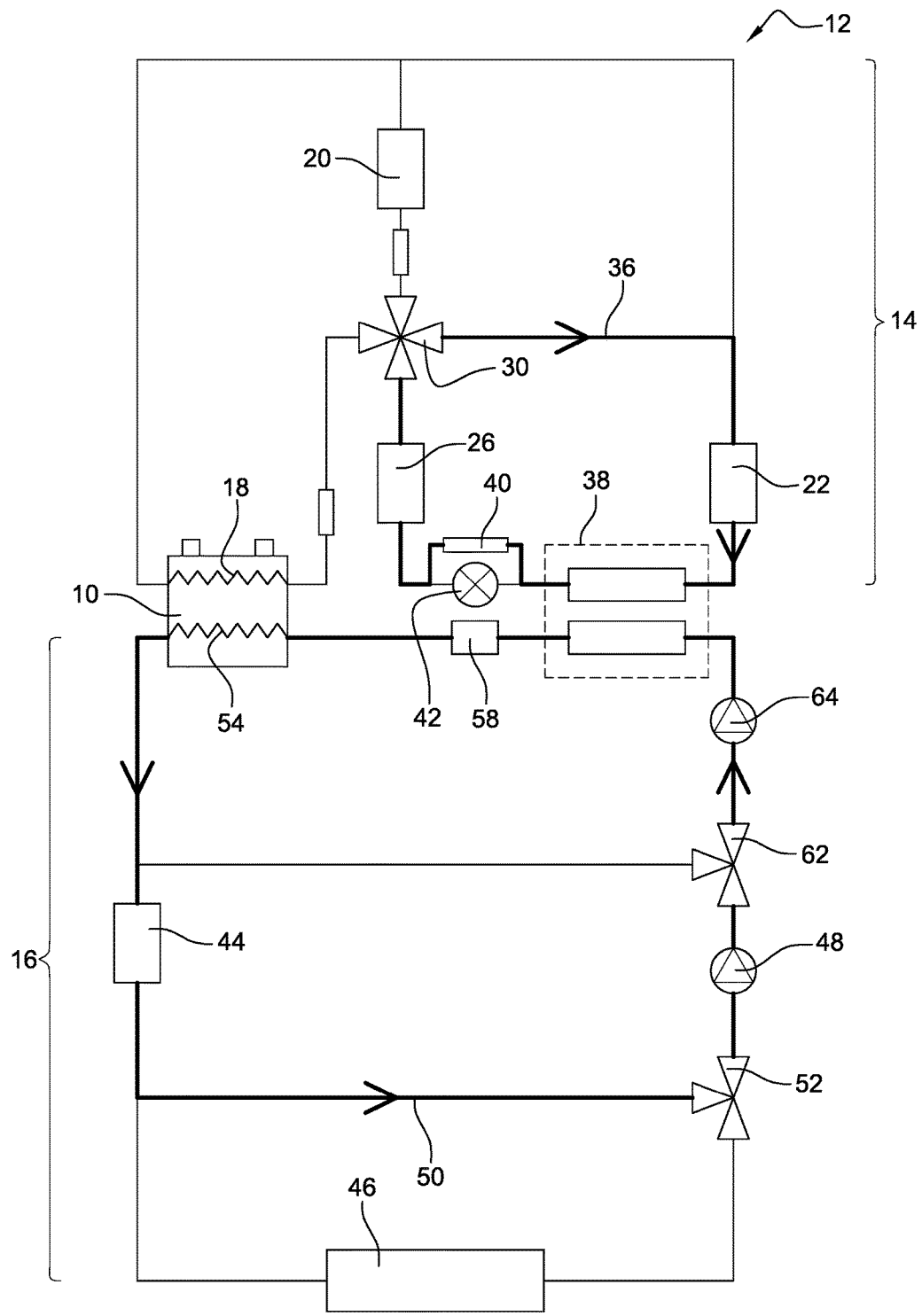
FIG. 2 is a diagram similar to that from FIG. 1 showing the temperature control device operating in accordance with a first battery heating state when the electronic control unit is already hot.

As shown in FIG. 2, if the temperature of the battery 10 is below a lower temperature threshold and if the temperature of the electronic control unit 44 exceeds a particular temperature the temperature control device 12 is set to a first state for heating the battery 10.

The air-conditioning circuit 14 is then set to operate in "heat pump" mode. The modulation valve 30 is therefore set to its heat pump position, short-circuiting the evaporators 18, 20 via the modulation pipe 36. Similarly, the bypass valve 42 is set to its expansion position to divert the flow of the air-conditioning fluid to the expansion valve 40. The loop in which the air-conditioning fluid flows, represented in bold in FIG. 2, functions as a heat pump.

The air-conditioning fluid therefore absorbs heat in the condenser 26. Then, at the outlet of the compressor 22, the compressed air-conditioning fluid conveys a large quantity of heat. The heat exchanger 38 is the only unit that enables the air-conditioning fluid to give up heat. A large amount of heat is therefore transmitted to the cooling fluid via the heat exchanger 38.

In the cooling circuit 16 the heating valve 52 is set to its heating position. The cooling fluid therefore flows in the loop represented in bold in FIG. 2 without being cooled by the main radiator 46. The cold start valve 62 remains in its heating position.

The cooling fluid is circulated by the first pump 48 and/or the second pump 64. The cooling fluid therefore absorbs heat from the electronic control unit 44 and then absorbs heat transmitted by the hot air-conditioning fluid via the heat exchanger 38. This therefore makes it possible to cool the electronic control unit 44.

The hot cooling fluid then passes through the battery radiator 54 to transmit at least some of the heat it conveys to the battery 10 to heat it. The cooling fluid cooled in this way begins a new cycle.

When the temperature control device 12 is set to its first heating state, the thermo plungers 58 are activated only if the electronic control unit 44 and the heat exchanger 38 are not hot enough to heat the battery 10 effectively.

Figure 3:
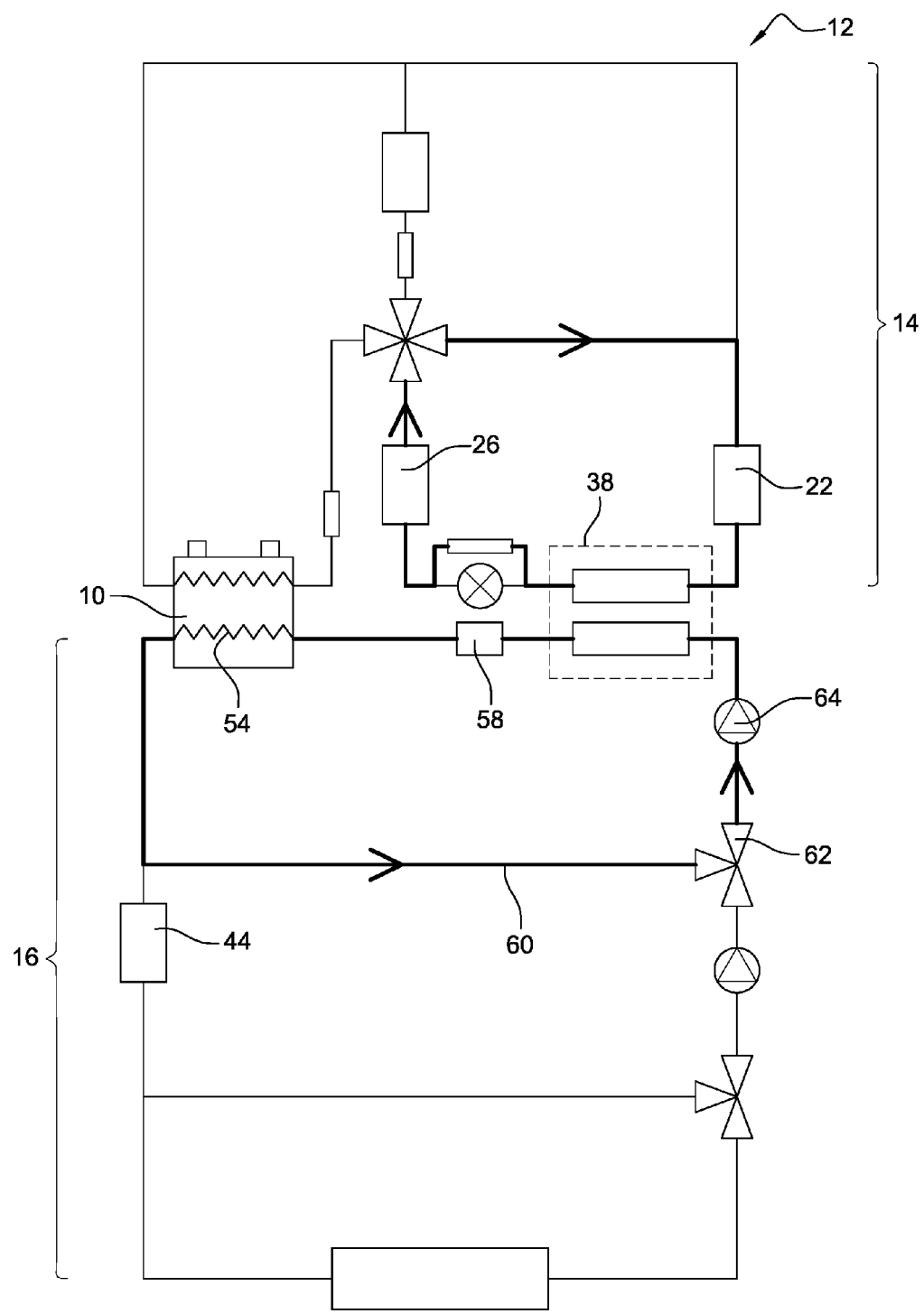
FIG. 3 is a diagram similar to that from FIG. 1 showing the temperature control device operating in accordance with a second battery heating state on starting from cold.

As shown in FIG. 3, if the temperature of the battery 10 is below its lower temperature threshold and if the electronic control unit 44 is at a temperature lower than a second particular temperature the temperature control device 12 is set to a second heating state termed the "cold start state".

This second temperature is determined so that the electronic control unit 44 is not damaged. If the temperature of the electronic control unit 44 exceeds this particular temperature, it is deemed necessary to cool it. The temperature control device 12 is then set to its second heating state.

In this cold start state, the air-conditioning circuit 14 still operates in "heat pump" mode as explained for the first heating state of the temperature control device 12.

On the other hand, the cold start valve 62 of the cooling circuit 16 is set to its cold start position. The cooling fluid is then circulated by the second pump in the loop indicated in bold in FIG. 3. The cooling fluid is therefore heated on passing through the heat exchanger 38. The hot cooling fluid then enters the battery radiator 54 to heat the battery 10. The cooling fluid cooled in this way is routed directly to the heat exchanger 38 via the cold start pipe 60 to begin a new cycle.

When the temperature control device 12 is set to its cold start state, the battery 10 is heated particularly effectively by the air-conditioning circuit 14 operating in heat pump mode because the cooling fluid does not lose heat on passing through the cold electronic control unit 44.

The temperature control device 12 produced in accordance with the teachings of the invention therefore makes it possible to heat the battery 10 during a cold start even if the electronic control unit is cold and without using the thermo plungers 58. The air-conditioning circuit 14 operating in "heat pump" mode makes it possible to heat the battery 10 with a much higher efficiency than a thermo plunger. It is therefore possible to heat the battery 10 with a lower electrical power consumption than solutions utilizing thermo plungers.

Also, the control of the temperature of the battery 10 is particularly effective because the cooling of the battery 10 and the heating of the battery 10 are handled by two distinct units. Thus the battery evaporator 18 of the air-conditioning circuit 14 is dedicated to cooling the battery 10 while the battery radiator 54 of the cooling circuit 16 makes it possible to heat the battery 10 directly.

The invention claimed is:

1. A device for controlling a temperature of a battery onboard a motor vehicle, the temperature control device comprising:

an air-conditioning circuit of the motor vehicle in which circulates, as a first heat-transfer fluid, an air-conditioning fluid, the air-conditioning circuit including at least one evaporator, the at least one evaporator including a first evaporator to directly transfer of heat emitted by the battery to the air-conditioning fluid, a compressor to increase a pressure and a temperature of the air-conditioning fluid;

a cooling circuit in which circulates, as a second heat-transfer fluid, a cooling fluid, the cooling circuit including at least one first heat source adapted to heat the cooling fluid and a main radiator to cool the cooling fluid that can be short-circuited;

wherein the cooling circuit includes a battery radiator as a second, secondary radiator to directly transfer heat conveyed by the hot cooling fluid to the battery when the main radiator of the cooling circuit is short-circuited, wherein the cooling circuit includes a cold start pipe, a first end of the cold start pipe being connected as a bypass between the battery radiator and the first heat source and a second end of the cold start pipe being arranged upstream of a heat exchanger, a pump being arranged in a branch including the battery radiator, and a cold start valve enabling, in a first, cold start position, the cooling fluid to flow in a loop by short-circuiting simultaneously the first heat source and the main radiator, wherein when the first heat source exceeds a predetermined temperature the cold start valve can be set to a second heating position in which the cooling fluid flows in a loop through the first heat source and then a second heat source before reaching the battery, the cold start pipe being blocked, and wherein the cold start valve can be set to a third position in which the battery radiator is short-circuited, the cooling circuit including a second pump to enable circulation of the cooling fluid between the first heat source and the main radiator.

2. The temperature control device as claimed in claim 1, wherein the second heat source of the cooling circuit is formed by the heat exchanger, the heat exchanger is arranged directly upstream of the battery radiator and makes it possible to transfer heat from the air-conditioning fluid directly to the cooling fluid, the heat exchanger being arranged directly downstream of the compressor in the air-conditioning circuit.

3. The temperature control device as claimed in claim 2, wherein the air-conditioning circuit includes:

a modulation pipe that is adapted to short-circuit the at least one evaporator, the modulation pipe being positioned downstream of a condenser and upstream of the compressor, by controlling a modulation valve when the air-conditioning circuit is operating in a heat pump mode; and an expansion valve that is arranged in a bypass between the heat exchanger and the condenser, a bypass valve enabling control of the passage of the air-conditioning fluid in the expansion valve in the heat pump mode of the air-conditioning circuit.

4. The temperature control device as claimed in claim 2, wherein the cooling circuit includes thermo plungers that are configured to heat the cooling fluid.

5. The temperature control device as claimed in claim 2, wherein a part of the heat exchanger through which the air-conditioning fluid flows forms a condenser.

6. The temperature control device as claimed in claim 1, wherein the first heat source is formed by an electronic control unit that controls electrical charging of the battery.

7. The temperature control device as claimed in claim 3, wherein the at least one evaporator includes a second evaporator, positioned in parallel with the first evaporator, to cool air in a ventilation duct of the passenger compartment.

8. The temperature control device as claimed in claim 7, wherein the first evaporator and the second evaporator are connected in parallel to the compressor via a common pipe, the compressor being positioned downstream of the first evaporator and the second evaporator.

9. The temperature control device as claimed in claim 7, wherein the second evaporator is also short-circuited by controlling the modulation valve when the air-conditioning circuit is operating in the heat pump mode.

* * * * *